US009658033B1

(12) United States Patent
Perciballi

(10) Patent No.: US 9,658,033 B1
(45) Date of Patent: May 23, 2017

(54) LATTICE REINFORCED ARMOR ARRAY

(71) Applicant: Armorworks Enterprises, LLC, Chandler, AZ (US)

(72) Inventor: William J. Perciballi, Phoenix, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 666 days.

(21) Appl. No.: 13/896,699

(22) Filed: May 17, 2013

Related U.S. Application Data

(60) Provisional application No. 61/648,745, filed on May 18, 2012.

(51) Int. Cl.
| | | |
|---|---|---|
| *F41H 5/02* | (2006.01) | |
| *F41H 5/04* | (2006.01) | |
| *B21D 31/04* | (2006.01) | |
| B23K 20/02 | (2006.01) | |

(52) U.S. Cl.
CPC ........... *F41H 5/0421* (2013.01); *B21D 31/04* (2013.01); *F41H 5/0478* (2013.01); *B23K 20/025* (2013.01)

(58) Field of Classification Search
CPC ... F41H 5/0421; F41H 5/0478; B23K 20/025; B21D 31/04
USPC ....................................................... 89/36.02
See application file for complete search history.

(56) References Cited

U.S. PATENT DOCUMENTS

| | | | | |
|---|---|---|---|---|
| 3,616,115 A | * | 10/1971 | Klimmek | F41H 5/0414 109/84 |
| 3,649,426 A | * | 3/1972 | Gates, Jr. | E04B 1/62 109/84 |
| 4,054,477 A | * | 10/1977 | Curran | B31D 3/0207 156/197 |
| 4,198,454 A | * | 4/1980 | Norton | B32B 3/12 102/303 |
| 4,251,579 A | * | 2/1981 | Lee | A62C 35/00 169/26 |
| 4,307,140 A | * | 12/1981 | Davis | B29C 37/0082 156/276 |
| 4,522,860 A | * | 6/1985 | Scott | B21D 31/04 29/6.1 |
| 4,625,710 A | * | 12/1986 | Harada | F24J 2/34 126/619 |
| 4,911,061 A | * | 3/1990 | Pivitt | F41H 5/0435 109/84 |
| 4,945,814 A | * | 8/1990 | Huet | F41H 5/0421 164/108 |
| 4,987,033 A | | 1/1991 | Abkowitz et al. | |
| 5,045,371 A | * | 9/1991 | Calkins | F41H 5/0414 428/220 |
| 5,191,166 A | * | 3/1993 | Smirlock | F41H 5/013 109/49.5 |
| 5,221,807 A | * | 6/1993 | Vives | F41H 5/023 109/82 |
| 5,349,893 A | * | 9/1994 | Dunn | F41H 5/04 2/2.5 |
| 5,361,678 A | | 11/1994 | Roopchand et al. | |
| 5,456,156 A | | 10/1995 | Semple | |
| 5,654,518 A | * | 8/1997 | Dobbs | F41H 5/0457 109/49.5 |

(Continued)

*Primary Examiner* — Michelle R Clement
(74) *Attorney, Agent, or Firm* — James L Farmer

(57) ABSTRACT

Designs and methods are provided for a hard armor structure comprising a symmetrical array of regularly shaped armor tiles, and a lattice structure comprising rigid cell walls surrounding each tile.

10 Claims, 3 Drawing Sheets

(56) References Cited

U.S. PATENT DOCUMENTS

| | | | | |
|---|---|---|---|---|
| 5,686,689 A | * | 11/1997 | Snedeker | F41H 5/0421 89/36.02 |
| 6,408,734 B1 | * | 6/2002 | Cohen | D04G 1/00 87/12 |
| 6,532,857 B1 | * | 3/2003 | Shih | F41H 5/0421 89/36.02 |
| 6,601,497 B2 | * | 8/2003 | Ghiorse | F41H 5/0414 109/49.5 |
| 6,641,385 B2 | * | 11/2003 | Fujita | B28B 3/269 264/177.12 |
| 6,740,381 B2 | * | 5/2004 | Day | B29C 70/086 428/309.9 |
| 6,826,996 B2 | | 12/2004 | Strait | |
| 6,860,186 B2 | * | 3/2005 | Cohen | F41H 5/0492 89/36.02 |
| 6,892,623 B2 | * | 5/2005 | Benyami | F41H 5/0421 89/36.02 |
| 7,077,306 B2 | * | 7/2006 | Palicka | B23K 20/025 228/170 |
| 7,157,158 B2 | | 1/2007 | Collier et al. | |
| 7,243,879 B2 | * | 7/2007 | Fanucci | B64C 5/12 244/123.1 |
| 7,604,876 B2 | * | 10/2009 | Collier | F41H 5/0421 148/403 |
| 7,703,375 B1 | * | 4/2010 | Scott | B29C 70/08 428/911 |
| 7,752,955 B2 | * | 7/2010 | Engelbart | F41H 5/0428 89/36.02 |
| 7,833,627 B1 | | 11/2010 | Ferrando | |
| 7,874,239 B2 | * | 1/2011 | Howland | F41H 1/02 2/2.5 |
| 7,913,611 B2 | * | 3/2011 | Terry | F41H 5/0414 89/36.02 |
| 8,069,494 B2 | * | 12/2011 | Sundnes | A41D 31/0061 2/2.5 |
| 8,087,143 B2 | * | 1/2012 | DiPietro | F41H 5/0442 109/49.5 |
| 8,151,685 B2 | * | 4/2012 | Joynt | F41H 5/023 89/36.02 |
| 8,215,585 B2 | * | 7/2012 | Gerken | B32B 3/12 244/121 |
| 8,424,442 B2 | * | 4/2013 | Ward | F41H 5/0414 52/385 |
| 8,524,023 B2 | * | 9/2013 | Engelbart | B29D 99/0021 112/475.08 |
| 8,720,314 B2 | * | 5/2014 | Engelbart | F41H 5/0435 296/187.07 |
| 8,960,262 B2 | * | 2/2015 | Grozdanich | F41H 5/00 164/75 |
| 8,961,733 B2 | * | 2/2015 | Dodd | A41D 13/0153 156/290 |
| 8,967,230 B2 | * | 3/2015 | Grozdanich | F41H 5/00 164/100 |
| 9,052,164 B2 | * | 6/2015 | Simovich | F41H 5/007 |
| 9,115,960 B2 | * | 8/2015 | Kim | F41H 5/24 |
| 9,366,506 B2 | * | 6/2016 | Willson | F41H 5/0492 |
| 9,453,322 B2 | * | 9/2016 | Milton | E02D 29/02 |
| 2004/0020353 A1 | * | 2/2004 | Ravid | F41H 5/023 89/36.02 |
| 2007/0214951 A1 | * | 9/2007 | Swinson | E04H 9/10 89/36.04 |
| 2007/0238379 A1 | * | 10/2007 | Bhatnagar | F41H 5/0457 442/135 |
| 2008/0104735 A1 | * | 5/2008 | Howland | F41H 1/02 2/2.5 |
| 2009/0235813 A1 | * | 9/2009 | Cashin | B32B 5/26 89/36.02 |

* cited by examiner

LATTICE REINFORCED ARMOR ARRAY

TECHNICAL FIELD AND BACKGROUND

The technical field of the present invention generally relates to anti-ballistic armor, and more particularly to hard armor panels made with ballistic grade ceramic armor tiles. The technical field may further relate to various applications of hard armor, including protective vehicle panels, and hard body armor such as Small Arms Protective Inserts. This application claims the benefit of U.S. Provisional Application No. 61/648,745 filed on May 18, 2012, the entire contents of which are hereby incorporated by reference.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
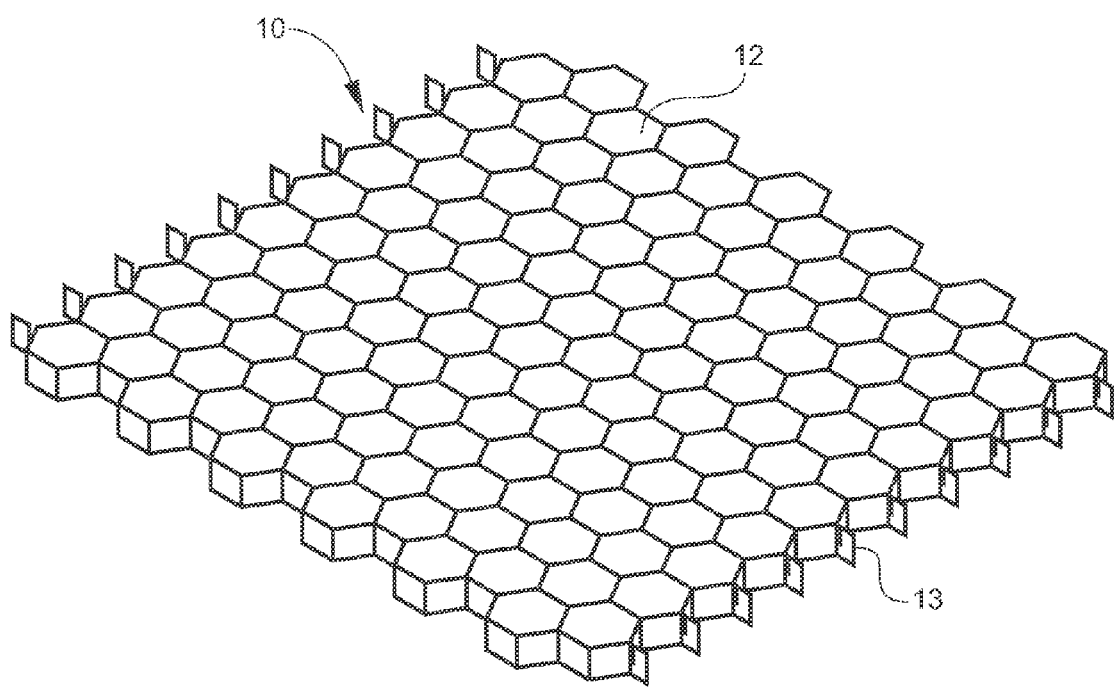
FIG. 1 is a perspective view of an exemplary lattice reinforced armor array.

Referring now specifically to the drawings, a lattice reinforced armor array according to one exemplary embodiment of the present disclosure is illustrated in FIG. 1, and shown generally at reference numeral 10. Armor array 10 comprises armor tiles 12 contained in a rigid lattice structure 13. In the depicted embodiment the tiles 12 are hexagonal, although other regular geometric shapes such as for example square, rectangular, triangular, or circular are also possible. The tiles are made from any high strength material suitable for anti ballistic armor applications, including armor grade ceramics such as alumina, silicon carbide (SiC), boron carbide (B4C), titanium carbide, titanium diboride, and tungsten carbide, to name a few.

Lattice 13 forms an array of cells that surround and conform to the contained armor tiles. The lattice structure 13 may be any rigid, high strength material such as metal, fiberglass, ceramics such as tungsten carbide, or various high performance polymers and composites. In the case of ceramic, the density and other material properties of the lattice ceramic may be the same, or substantially different than the material properties of the ceramic tile.

The present inventors have discovered that in armor tile arrays, the need to minimize gaps between tiles must be balanced with the need to prevent damage propagation between tiles. The lattice structure of the present disclosure acts as a barrier, tending to resist the spread of impact damage from one tile to the next without significant gaps between tiles. The inventors have further determined that the spacing between tiles may thus be reduced despite the presence of the lattice walls. Once assembled, the lattice and tiles may be consolidated into a unitary structure. Consolidation may be achieved through any of various means such as adhesive bonding, potting, welding, brazing, or casting.

Figure 2:
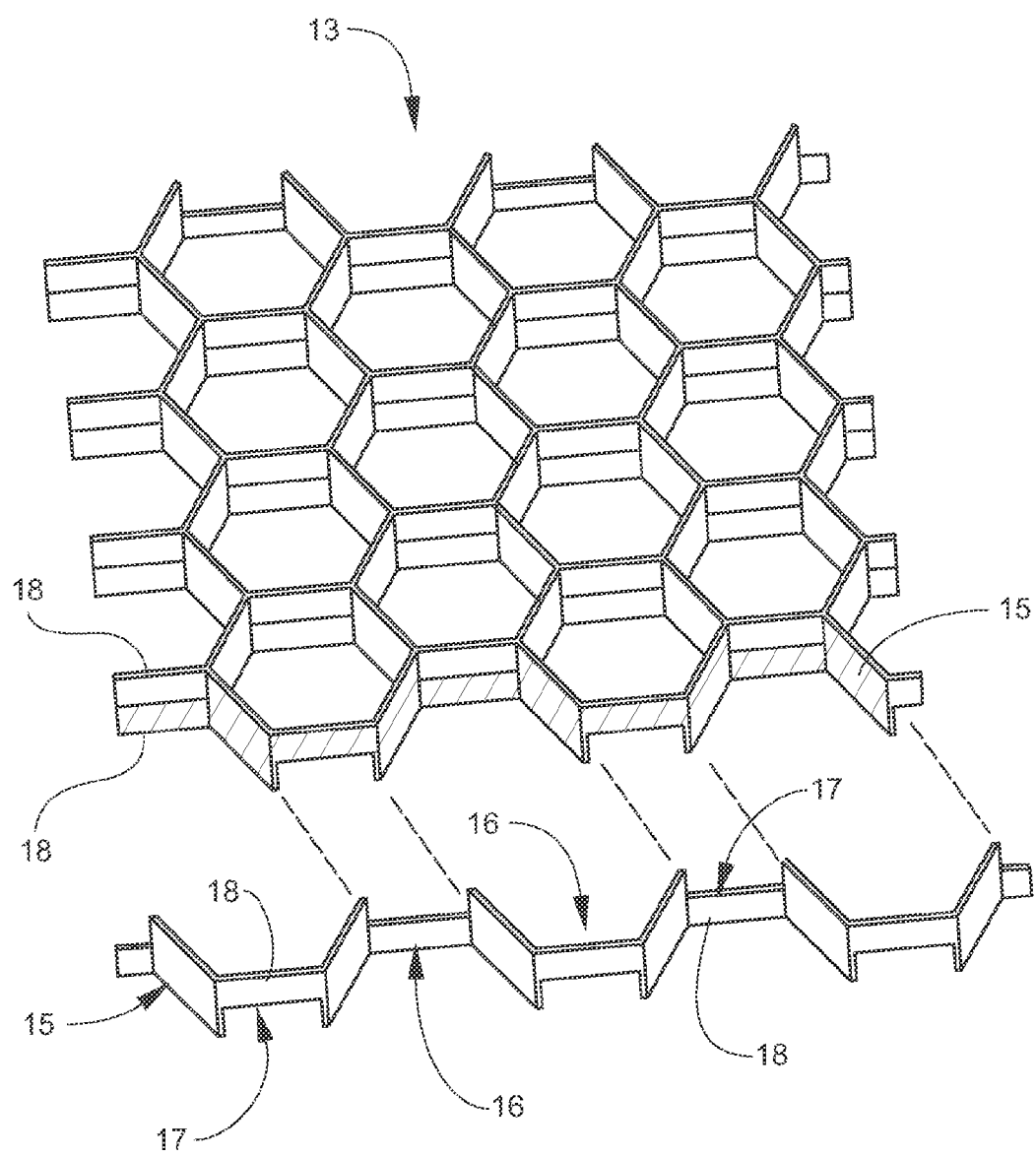
FIG. 2 is a partially exploded view of an exemplary lattice structure comprising multiple, adjacent, formed metal strips.

Referring now to FIG. 2, an exemplary embodiment of lattice structure 13 comprises formed metal strips 15 arranged side-by-side in a symmetrical configuration. For clarity, one strip 15 of lattice 13 is shown cross hatched in FIG. 2, and another strip is shown spaced away from the lattice structure. Each strip 15 of structure 13 is bent in a repeating, three-sided shape to form alternating, half hexagonal cells 16 on opposite sides of the strip. Strips 15 also include notches 17 in the middle wall of each half cell, leaving half-walls 18. The notches 17 alternate, such that along one side of the strip 15 the notches are all on one edge, while on the other side of the strip the notches are all on the opposite edge. In addition, the notches 17 account for at least half the width of strip 15, so that when adjacent strips are brought together, each notch 17 on one strip receives a corresponding half wall 18 of an adjacent strip. As best seen along the left edge of the depicted structure, the half-walls 18 overlap and align to essentially form a single thickness cell wall.

Figure 3A:
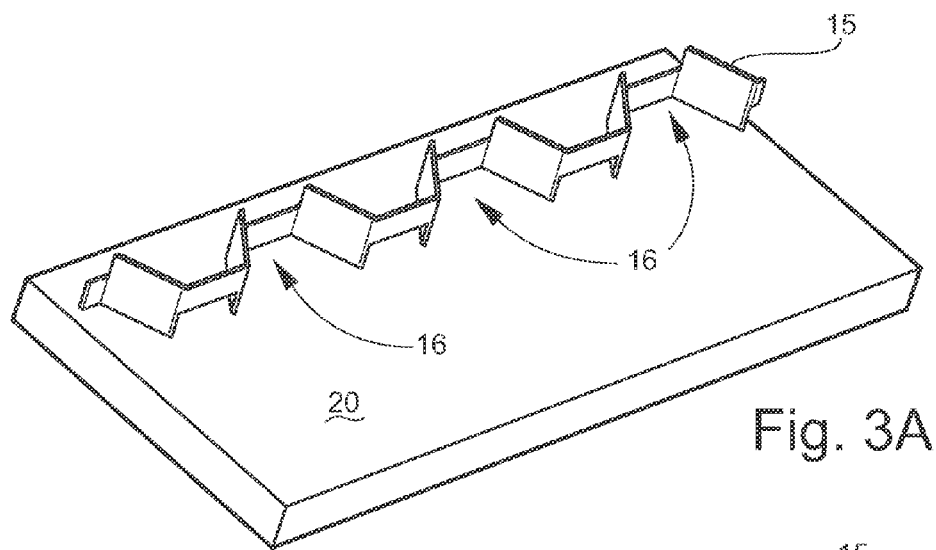
FIGS. 3a through 3c depict an exemplary method of assembling an armor array using the lattice structure of FIG. 2.
Figure 3B:
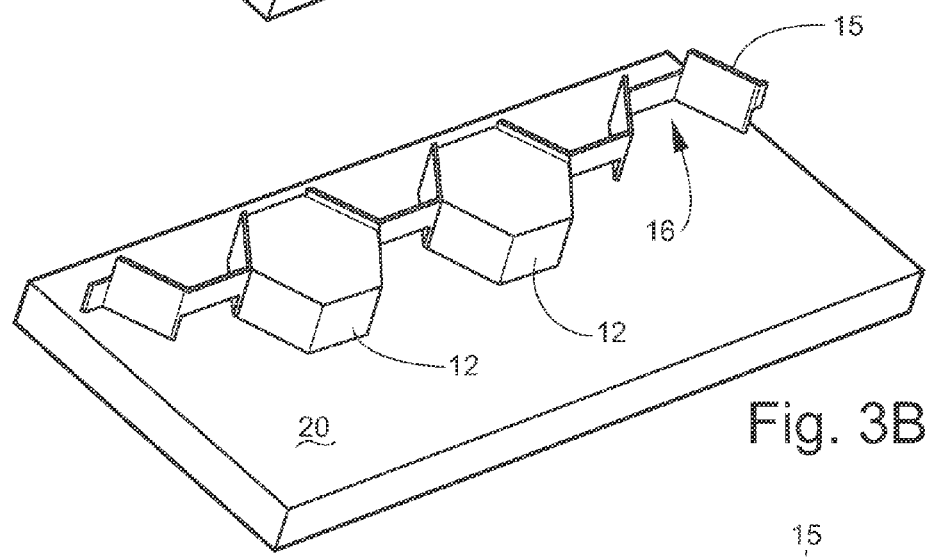
Figure 3C:
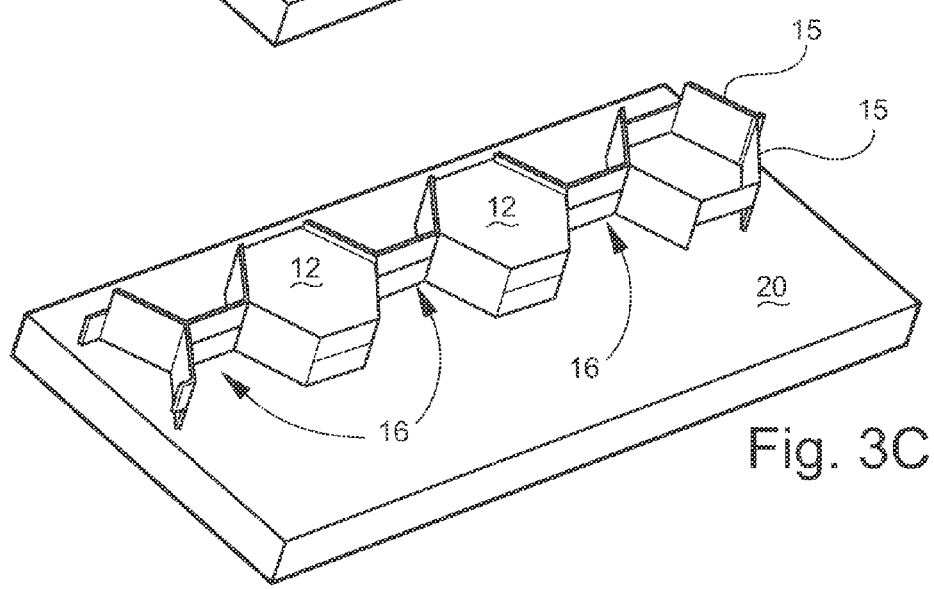

FIGS. 3a through 3c illustrate one method of assembling the armor array embodiment of FIG. 2 in which the lattice and tiles are laid down in successive rows. Referring first to FIG. 3a, a first formed metal strip 15 is positioned atop a flat surface 20. Surface 20 may be a fixture used only for assembly, or alternatively a ballistic resistant backing panel to be integrated with the armor array. In the latter case, surface 20 may be pre-treated with an adhesive for ultimately creating a bond between the armor array and the backing panel. As shown in FIG. 3b, tiles 12 are then fitted into the half-cells 16 along one side of the first metal strip 15. The tiles may include a pre-applied adhesive film on the sides facing the metal strips. Referring to FIG. 3c, a second formed metal strip 15 is then installed adjacent to the first metal strip in the overlapping manner described above. The second metal strip completes the hexagonal cells around each tile, and completes one row of the lattice assembly. A third row may be added by again fitting another row of hexagonal tiles (not shown) in the outward facing half-cells 16 of the second metal strip, followed by positioning a third metal strip 15 (not shown) against the tiles, and so on. In the resulting assembly each successive row of tiles traps the previously installed metal strip 15, creating an inherently interlocking structure.

Once the assembly process is completed, a bonding or potting agent may be applied to consolidate and solidify the array. Suitable bonding agents include various epoxies, polyurethanes, and acrylics. In one embodiment a thick layer of the bonding agent is poured over the tiles and forced into the assembly between the tiles, much like a typical tile grouting process. In another embodiment, a brazing coating is applied to one or both of the tiles and lattice, and the assembly is braze bonded in a furnace. The armor array may also be combined with a ballistic resistant backing panel in the same or a subsequent bonding process. An exemplary ballistic resistant backing panel may comprise simply a solid plate such as steel or titanium, or alternatively composite boards made of ballistic resistant fibers such as glass, or various high performance polymers. Methods and materials for the manufacture of backings made from high performance fiber are described for example in U.S. Pat. Nos. 5,437,905, 5,635,288, 5,443,883, 5,547,536, 6,408,733, 7,549,366, the entire contents of which are hereby incorporated by reference. Where weight is critical, any of the above materials may be laminated with an open celled material such as foam or honeycomb to produce a lightweight backing panel.

In another embodiment of the assembly process, the tiles are installed after the lattice structure 13 is completely assembled, instead of during assembly as in the above described process. For example, the above described formed metal strips 15 may be positioned side-by-side atop a surface 20 in the manner described to form a complete lattice structure 13. Once the lattice is complete, the cells are filled with tiles, and again solidified by a suitable bonding or potting process.

In an alternative embodiment, the completed lattice is a unitary structure rather than a loose assembly prior to tile installation. Such a structure may be fabricated in any number of ways. For example, the metal strips of the previously described embodiment may be welded or brazed together after assembly to create an interconnected cell array. A metal structure could alternatively comprise an assembly of individual cell walls arranged in a jig and brazed or welded together, or various combinations of bent metal strips and individual cell walls. In yet another metal structure, multiple lattice patterned layers are cut out from sheet stock by punching or laser cutting. The relatively thin patterned layers are stacked to create cell walls of a desired height, and then welded or brazed together.

A unitary lattice could also comprise a homogeneous structure made by a suitable casting or molding process. For example, in one such embodiment a lattice structure could be simply injection molded from a high strength polymer. In another embodiment a matched metal mold is used to create a structure using fiber reinforced polymer composite. In yet another embodiment, a process similar to investment casting, or lost wax method, is used to cast a metal lattice structure directly into a tile array. In particular, a lattice structure is first fabricated from a sacrificial material such as wax or foam. The cells of the lattice are then filled with ceramic tiles to create an armor assembly. The assembly is then mounted in a suitable casting fixture, where the sacrificial material is displaced by a metal such aluminum or titanium.

Example Lattice Reinforced Armor Array:
Description: hexagonal ceramic tiles and formed metal strip configuration of FIG. 2
Tile dimensions: 36 mm width (flat to flat); 18 mm thick
Tile material: armor grade alumina with purity greater than 85%
Lattice: 0.022 in. stainless steel sheet
Adhesive: Shell Epon 828 industrial epoxy
Backing: 0.5 in. thick fiberglass polyester composite For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A hard armor structure, comprising:
   a symmetrical array of hexagonal, regularly shaped armor grade ceramic tiles; and
   a metal lattice structure comprising rigid cell walls surrounding each tile made of strips of formed sheet metal in a side-by-side configuration, wherein the strips of sheet metal are formed in a repeating, three sided shape to define alternating, half hexagonal cells on either side of each strip.

2. The hard armor structure of claim 1 wherein the metal strips further comprise notches in the middle wall of each half hexagonal cell that alternate, such that along one side of the strip the notches are all on one edge, while on the other side of the strip the notches are all on the opposite edge.

3. The hard armor structure of claim 2, wherein the notches account for at least half the width of the strip, such that when adjacent strips are brought together, each notch on one strip receives a remaining half-wall of an adjacent strip.

4. The hard armor structure of claim 1 further comprising a solidifying agent applied to the tile array and lattice structure.

5. The hard armor structure of claim 4, wherein the solidifying agent is selected from the group comprising epoxies, polyurethanes, polyesters, vinyl esters, polyolefins, and acrylics.

6. The hard armor structure of claim 5, further comprising a ballistic resistant backing.

7. The hard armor structure of claim 6, wherein the ballistic resistant backing comprises a consolidation of high performance fibers.

8. The hard armor structure of claim 1, wherein the lattice structure material is one of the group comprising: polymer resin; fiber reinforced polymer composite; and ceramic.

9. The hard armor structure of claim 8, wherein the armor tiles are made of a first ceramic material, and the lattice structure is made of a second ceramic material.

10. The hard armor structure of claim 9, wherein the densities of the first and second ceramic materials are not the same.

* * * * *